United States Patent

Foss

[15] 3,704,639

[45] Dec. 5, 1972

[54] TAPERING TOOL FOR TUBULAR ARTICLES

[72] Inventor: Rudolph G Foss, Tulsa, Okla.

[73] Assignee: Unique Industries, Inc., Tulsa, Okla.

[22] Filed: May 17, 1971

[21] Appl. No.: 144,045

Related U.S. Application Data

[63] Continuation-in-part of Ser. Nos. 63,366, Aug. 13, 1970, and Ser. No. 114,191, Feb. 10, 1971.

[52] U.S. Cl. .................................82/4 C, 144/205
[51] Int. Cl. .............................................B23b 3/26
[58] Field of Search........................82/4 C; 144/205

[56] References Cited

UNITED STATES PATENTS

| | | | |
|---|---|---|---|
| 3,167,982 | 2/1965 | Sherwood | 82/4 C |
| 1,915,350 | 6/1933 | Anderson | 82/4 C |

*Primary Examiner*—Leonidas Vlachos
*Attorney*—Head & Johnson

[57] ABSTRACT

This invention comprises a tool for cutting an external taper on the end of a tubular article, such as a fiberglass pipe. It comprises a supporting member which rotatably carries an expandable collet mounted on a collet shaft. An arm is slidably positioned in the supporting member substantially perpendicular to said outlet shaft. The arm carries a cutter blade assembly. A cam is cut into the collet shaft with a cam follower on a pump, which supplies fluid under pressure to a cylinder, the piston of which is connected to the arm. pRotation of the cutter blade assembly about the collet shaft causes fluid under pressure to flow into the cylinder, causing the piston and the arm to be displaced, bringing the cutter blade into contact with the pipe held by the collet. The cutter blade assembly which is adapted to carry a plurality of cutting blades in turret fashion, is rotatably positioned on a support bar fastened to said first shaft.

20 Claims, 8 Drawing Figures

INVENTOR.
RUDOLPH G. FOSS
BY Head & Johnson
ATTORNEYS

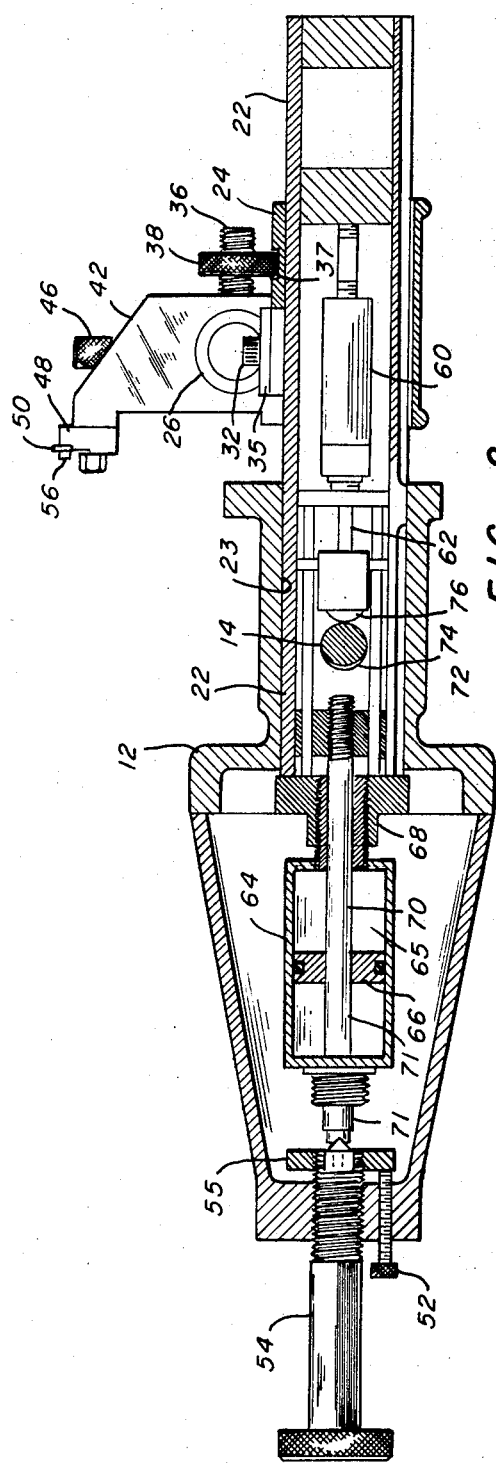

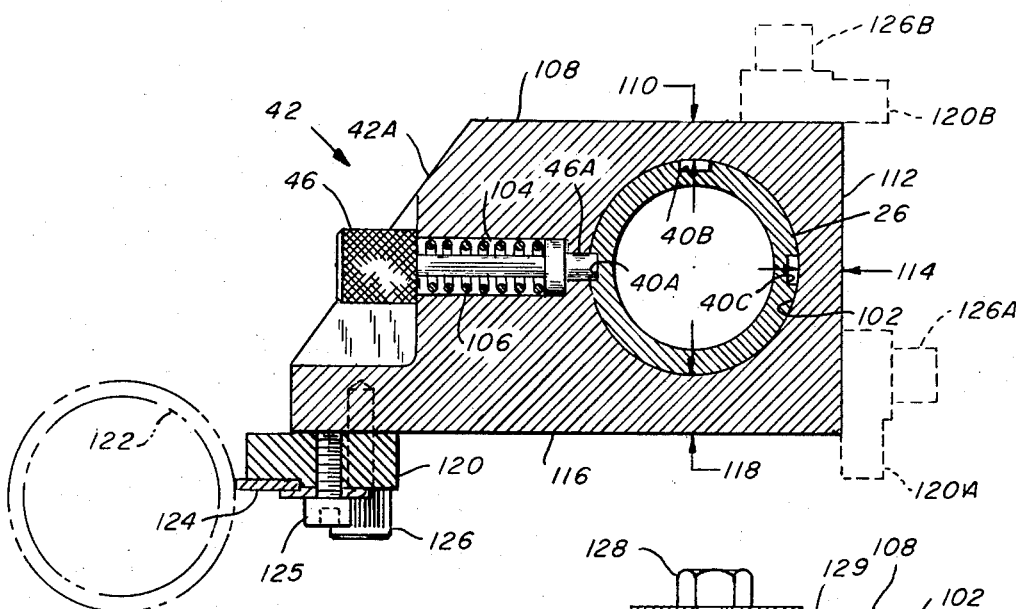
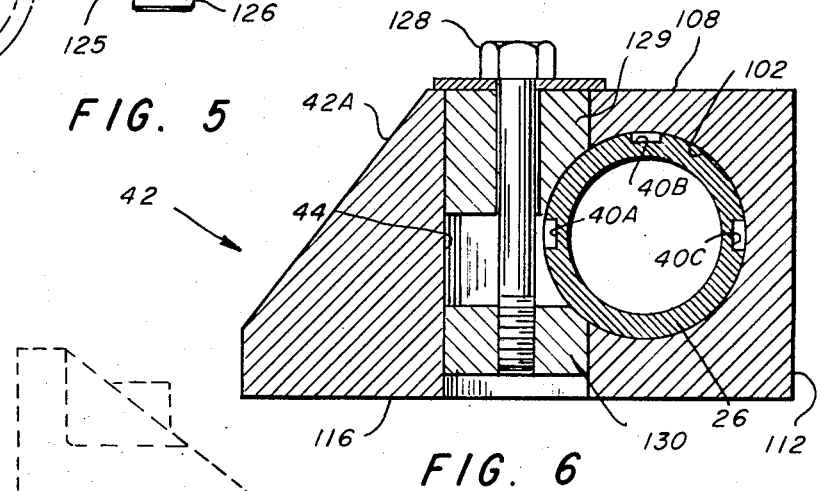
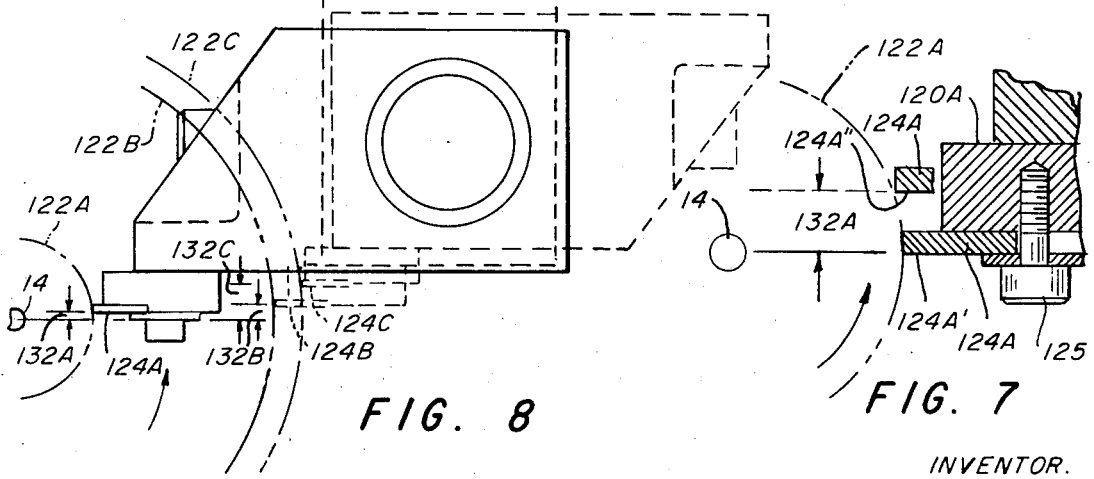

TAPERING TOOL FOR TUBULAR ARTICLES

CROSS-REFERENCE TO RELATED APPLICATIONS

This application is a continuation in part of my copending applications, Ser. No. 63,366 entitled "Tapering Tool For Fiberglass Pipe," filed Aug. 13, 1970, and Ser. No. 114,191 entitled "Fiberglass Pipe Working Tool," filed about Feb. 10, 1971.

BACKGROUND OF THE INVENTION

1. Field of the Invention

This invention relates to tapering tools. More particularly it relates to tools for cutting external tapers on the ends of tubular articles such as pipes, and particularly plastic and/or fiberglass pipe.

2. Description of the Prior Art

Pipe tapering tools in the art generally comprise a collet or mandrel on a collet shaft for holding the pipe. Rotatable about the collet shaft is a housing carrying a radial arm from which is supported a cutter blade bracket, with an elongated cutting blade substantially parallel to the axis of the collet. The radial arm is adapted, by screw means, to be traversed radially inward. This carries the cutting blade toward the collet and the pipe mounted thereon. The housing is relatively rotated about the pipe, and by means of the screw the cutter blade is fed inwardly, the cutting blade meanwhile cutting a taper on the end of the pipe. During the cutting operation the blade is advanced stepwise by turning the screw means.

SUMMARY OF THE INVENTION

It is an object of this invention to provide an improved taper cutter, in which the cutting blade is advanced continuously, at a rate proportional to the relative rate of rotation of the tubular article and the cutting blade.

It is a further object to provide this advancement by hydraulic means.

It is a further object to provide pressure relief means to limit the maximum force with which the cutting bar is pressed against the surface of the article.

It is a further object to provide a cutting blade holding means such that leading edges of the cutting blade can be positioned in one of a plurality of positions behind the plane passing through the axis of rotation of the collet.

It is a further object of this invention to provide a cutting blade assembly positioning means such that rectangular cutting edges can be used on the cutting blade.

These objects are accomplished by providing a housing in which the collet shaft, carrying a collet, is journalled, and a radial arm from which is supported the cutting blade assembly, hydraulic means are provided for traversing the radial arm in an axial direction within the housing.

A cam is cut on the collet shaft at a point within the housing. Also within the housing is a hydraulic pump, with its piston rod carrying a cam-following roller riding on the cam. As the collet shaft rotates one revolution, the pump piston goes through one pump cycle, advancing the cutting blade into the article mounted on the collet a selected small distance.

These and other objects and the principles of the invention will be understood from the following description taken in conjunction with the attached drawings, in which:

BRIEF DESCRIPTION OF THE DRAWINGS

FIGS. 1 and 2 show overall views of the tool, with FIG. 2 in section.

FIG. 3 illustrates a detail of FIG. 2.

FIG. 4 shows the hydraulic system in schematic form.

FIGS. 5 and 6 illustrate features of the cutting blade assembly.

FIGS. 7 and 8 illustrate a feature of the cutting blade assembly as it is used with different sizes of pipe.

DESCRIPTION OF THE PREFERRED EMBODIMENTS

Figure 1:
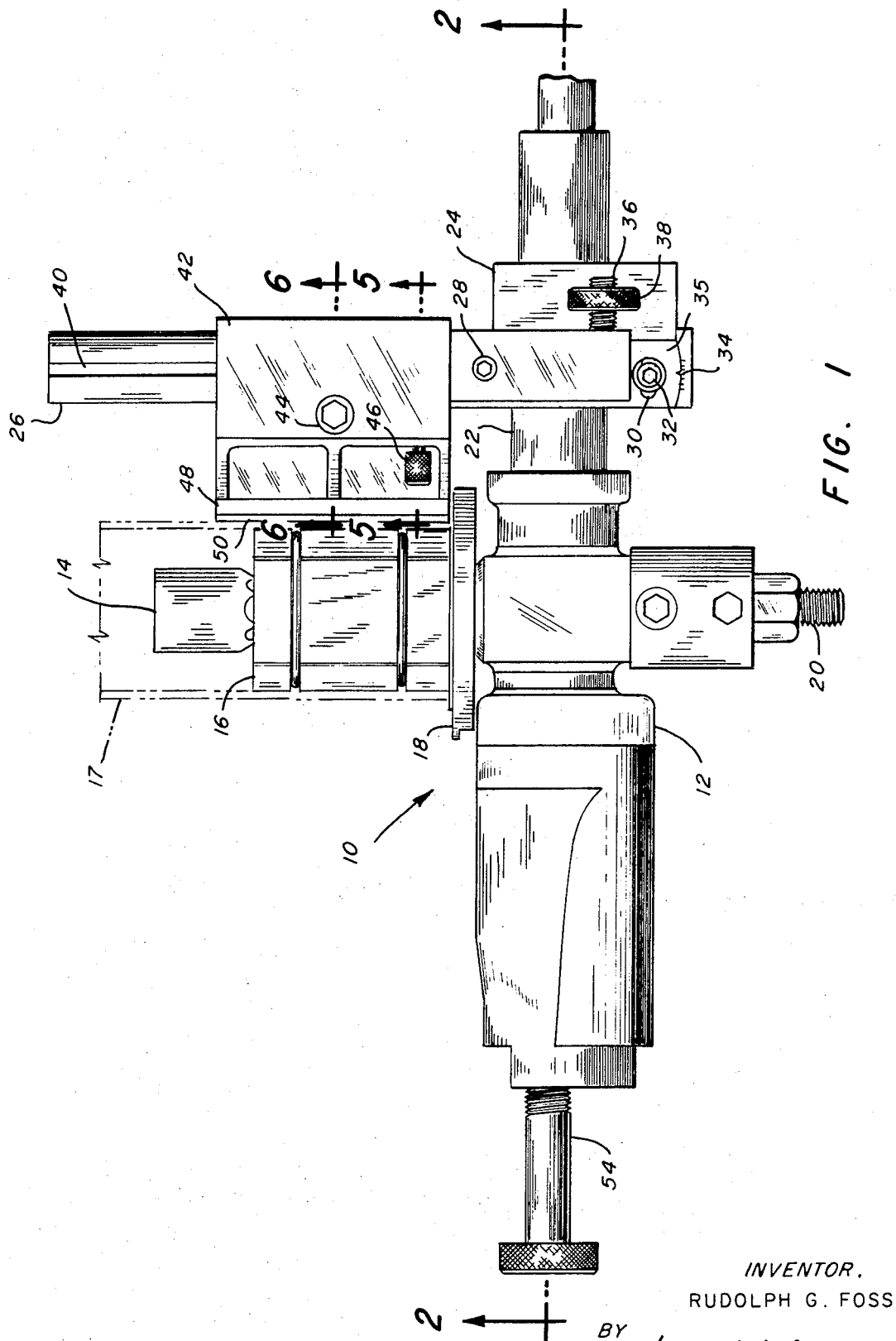

Referring now to the drawings, and in particular to FIGS. 1 and 2, I show a general view of the invention 10. It comprises a frame 12, generally elongated in shape. The frame is adapted to have inserted into an axial cylindrical opening 23, a tubular radial arm 22. This arm carries a clamp means 24, which can be adjustably positioned along the arm 22. This clamp means carries a cylindrical support rod 26, which is pivotably fastened to the clamp means 24 by bolt 28, about which it pivots, and locked by bolt 32, which operates through a slot 30 in a flat extension 35 of the rod 22. The end of the rod carries indicia 34 by means of which a measure of the angle of the rod can be obtained. The rod angle can be changed by loosening bolts 28 and 32, and screwing knurled nut 38 on threaded rod 36. The nut is locked in groove 37. Thus, as the nut is turned, the angle of the arm 26 can be changed, after which it is again locked by bolts 28 and 32.

Shaft 14 is journalled in the frame 12 at right angles to the axis of arm 22. On one end of shaft 14, called the collet shaft, is an expandable collet 16 adapted to clamp to the inside surface of, and to hold one end of the tubular article 17 which is to be tapered. The other end of the shaft 14 is fitted to be rotated by a power device. The collet and the power device are both well known articles of commerce and form no part of this invention.

The support rod 26 is mounted to be substantially parallel to the collet shaft 14, but is adjustable by a small angle about that position. The support rod 26 also carries the turret type cutting blade assembly means 42, which will be described later in connection with FIGS. 5, 6, 7 and 8. Suffice to say at this time that the assembly 42 rotates about and slides along the support rod 26, and carries on a plurality of longitudinal surfaces, cutting bars 48 each of which carries a thin cutting blade of hard metal 50. The cutting edges can be tilted by the angle of the rod 26, to be at the proper angle of the taper, to the axis of the collet shaft. As the arm 22 is drawn inwardly into the frame 12, the cutting blade 50 is brought into contact with the tubular article, or pipe 17, mounted on the collet, and as the collet shaft and cutting blade are relatively rotated, the cutting blade will cut the desired taper on the end of the pipe.

Referring more particularly to FIGS. 2 and 3, the collet shaft 14 is cut as a cam into the shape of an offset cylinder 74. There is a cam follower 76 riding on this cam, and being supported by a piston rod 62 of a fluid pump 60. As the piston rod is cycled inwardly and outwardly (as the shaft 14 is rotated) the pump will pass fluid from a reservoir 78 (FIG. 4) to a cylinder 64 in the frame 12. This cylinder 64 carries a piston 66 with piston rods 70, 71 sealed through the two ends of the cylinder. The cylinder is fastened by screw means 68 to the frame 12 and the piston rod 70 slides through means 68 and is threaded into nut 72 which is pinned to tubular arm 22.

Fluid from pump 60 goes to the space 65 in cylinder 64, causing the piston to be displaced to the left, and causing the arm 22 to be drawn into the housing, and the cutting blade 50 to be pressed against the pipe 17. AS the piston moves to the left it eventually seats against stop 55 which is adjustably positioned by means of stop screw 54. Limit screw 52 can be set to act as a limiting stop for screw 54. When the piston 66 has reached the limit of movement set by stop 55 against limit screw 52, the pressure builds up to a selected value at which a relief valve bypasses the fluid back to the reservoir. This represents the maximum depth of the taper cut. The arm is then repositioned to its outer position by opening a bypass valve in the fluid system (as will be explained in connection with FIG. 4) and manually forcing the piston 66 to the right by means of screw 54. This also forces the arm 22 out of the socket 23. The stop screw 54 is then drawn back against limit screw 52. The bypass valve is again closed. The pipe 17 is taken off the collet and replaced with another pipe, and the operation repeated.

In FIG. 4 is shown in schematic form the hydraulic system. In view of this diagram, no piping is shown in FIG. 2, it being well understood how the system of piping of FIG. 4 can be applied to FIG. 2. The reservoir 78 has piston 80 which is backed by spring 82, which presses on the liquid 96. The pump 60, responsive to the oscillation of the piston rod 62 by cam 74, pumps liquid from 96 via pipe 83, and forces it via pipe 84 through check valve 85 to point 86. Here the pressure is indicated by gauge 87. In normal operation the liquid under pressure goes to junction 89 through a second check valve 88, thence via pipe 90 to cylinder space 65 where the piston 66 is forced to move upward until the piston rod 71 reaches stop 55. When it hits the stop, the pressure in 65, and all the way back through 90, 89, 88, 86, 85 and 84 to the pump builds up to a high value.

The relief valve 98 connected to junction 86 is set to limit the pressure to a selected maximum value. When this is reached, the fluid then flows from 86 through 97, through relief valve 98, through 99, 93, and 94 back to space 96 in the reservoir 78.

When the arm 22 is to be repositioned, bypass valve 92 is opened, and the screw 54 presses on piston rod 71 and forces the piston 66 down, driving fluid from space 65 through 90, bypass valve 92, to 93, and 94 to the reservoir chamber 96. Then the valve 92 is closed and the operation can be continued.

The relief valve 98 offers a great safety feature in that, no matter how much torque is applied to the collet shaft, the maximum force on the arm 22, and thus the force of the cutter blade 50 on the pipe 17 is preset. This permits more rapid cutting where the cutting is easy. Where the cutting is hard, it is slowed down, but there is always the constant maximum force of the cutting blade on the pipe.

The principle feature of this invention lies in the turret type cutting blade assembly. As shown in FIGS. 1, 2, 5 and 6, this is a massive block 42 with a longitudinal bore 102 to slip over the surface of the support rod 26. This block 42 has three faces (although four can be used) 108, 112, 116 each at right angles to the adjacent surface and each parallel to the bore 102. These faces are set at selected spacings 110, 114 and 118 respectively from the bore 102. These spacings can be equal or different. Each face has a plurality of tapped holes for bolts 126, 126A, 126B, that hold the cutting bars 120, 120A, 120B, respectively, to the faces. Each of the cutting bars are adapted to carry a thin cutting blade 124 of rectangular construction and of hard metal, such as carbide, as is well known in the art. The size of the cutting blade is, of course, variable. However, a typical size would be ⅛ × ⅜ × 6 inch.

As shown in FIG. 5, the support rod 26 (actually a tube), carries longitudinal grooves 40A, 40B, 40C. These are for the purpose of indexing the block 42 into a plurality of angular positions. The block is locked to the groove by pin 46 which is forced by spring 106, in bore 104 so that the tip 46A is inserted into the groove such as 40A shown. While this serves ideally to index the block, the block is further clamped to the support rod 26 (as in FIG. 6) by clamping screw 128 and clamp blocks 129 and 130. These fit into bore 44 in the block 42.

It will be noted from FIG. 5, that the cutting blade 124 is a rectangular strip. There are four similar cutting edges, each comprising an angle of 90°. This is contrary to normal cutting tool experience in which the tool is ground back to provide "heel clearance." This makes the cutting edge less that 90°.

In this invention I can use a 90° cutting edge, because I provide heel clearance in another way; by the contour of the work piece itself. Consider FIGS. 7 and 8, where I show the collet shaft 14 and the exterior surface 122A of the pipe. Pipe 122A is assumed to be of small diameter in the case shown in FIG. 7. Here the plane of the cutting edge 124A' is directed through the axis of the collet shaft 14. If a cut were to be made here, the cutting edge would have to be ground for heel clearance, otherwise the heel would not permit entry of the cutting edge into the surface 122A. By displacing the cutting blade 124A behind the plane passing through the axis of rotation, that is, in the direction of motion of the pipe 122A, by a distance 132A, it will be readily evident that because of the curvature of the pipe surface 122A, there is adequate heel clearance provided. Thus, a rectangular cutting edge can be used to cut into the surface and to remove material, and a rectangular cutting blade can provide four cutting edges instead of the two, conventionally provided. Of course, as the diameter of the pipe surface 122 increases to 122B or 122C, FIG. 8, the displacement of the cutting edge 132B, 132C, must be correspondingly increased. As pointed out in connection with FIG. 5, the variation in spacings 110, 114, 118 of the surfaces 108, 112, 116 from the bore 102 provides this desired change in spacings 132. This is a particularly useful feature of this invention, particularly when working with fiberglass pipe, where there is a certain amount of plasticity associated with the material of construction.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the appended claim or claims including the full range of equivalency to which each element or step thereof is entitled.

What is claimed:

1. In an apparatus for tapering the end of a tubular article, including a frame, a collet for receiving and clamping the end of said tubular article, said collet mounted on a collet shaft rotatably carried by and projecting outwardly from said frame, and cutter blade assembly means supported by said frame, the improvement comprising; turret cutting blade assembly means comprising:
   a. first shaft means radially traversable in said frame;
   b. clamp means mounted on said first shaft means;
   c. support rod means pivotably mounted on said clamp means, said rod means substantially parallel to said collet shaft but adjustable through a limited angle thereabout;
   d. turret cutting blade holder means rotatably mounted on said support rod, and adapted to be rigidly clamped thereto, said blade holder means comprising a block with a plurality of faces parallel to said support rod;
   e. means on each of said faces for attaching thereto at least one cutting blade; and
   f. means to radially traverse said first shaft means in said frame.

2. The apparatus as in claim 1 in which said means to radially traverse said first shaft means comprises screw means.

3. The apparatus as in claim 1 in which said means to radially traverse said first shaft means comprises hydraulic means.

4. The apparatus as in claim 3 in which said hydraulic means includes cam means on said collet shaft, pump means including first piston and piston rod means, cam follower means on said first piston rod means, cylinder means including second piston and second piston rod means, all mounted in said frame coaxially with said first shaft, said second piston means connected to said first shaft whereby when said collet shaft rotates with respect to said frame said pump forces liquid from a reservoir to said cylinder causing said second piston to be displaced and said first shaft to be traversed.

5. The apparatus as in claim 1 in which the plurality of faces of said block are substantially at right angles to each other.

6. The apparatus as in claim 5 in which said plurality of faces of said block are spaced at unequal distances from said support rod.

7. The apparatus as in claim 5 in which said plurality of faces of said block are spaced at equal distance from said support rod.

8. The apparatus as in claim 5 in which said cutting blade comprises a bar of rectangular cross section.

9. The apparatus as in claim 1 including means to traverse said blade holder means to a plurality of positions along said support rod.

10. The apparatus as in claim 1 including means for indexing said holder to a plurality of angular positions about said support rod.

11. The apparatus as in claim 1 including means for positioning the cutting blade to a plurality of positions in which the plane defined by the leading face of the cutting bar is displaced from the axis of the collet shaft by a plurality of selected distances.

12. In an apparatus for tapering the end of a tubular article including a supporting member, a collet for receiving the end of said tubular article, said collet mounted on a collet shaft rotatably carried by and projecting outwardly from said supporting member and cutter blade assembly means supported by said supporting member and adapted to relatively rotate about said collet shaft, the improvement comprising:
   a. said cutter blade assembly means mounted on a first shaft, said first shaft substantially perpendicular to said collet shaft, and adapted to be longitudinally traversable in said supporting member;
   b. means responsive to the relative rotation of said supporting member and said collet shaft to cause fluid to flow from a reservoir into a cylinder, said cylinder mounted in said support member coaxial with said first shaft;
   c. second piston and second piston rod means in said cylinder responsive to said fluid flow into said cylinder, said second piston rod fastened to said first shaft, whereby said second piston rod will cause said first shaft to be axially traversed in said supporting member and the spacing between said cutter blade assembly and said collet to be decreased as a function of the relative rotation of said cutter blade assembly means and said collet shaft.

13. The apparatus as in claim 12 in which said means to cause fluid to flow comprises cam means on said collet shaft, pump means including first piston and first piston rod means, and cam follower means on said first piston rod means.

14. The apparatus as in claim 13 in which said cam means, first piston means, first piston rod means, and cam follower means are enclosed in said supporting member.

15. The apparatus as in claim 12 including adjustable pressure relief means connected to said cylinder, whereby a selected maximum force is set on said second piston means.

16. The apparatus as in claim 12 in which said cutter blade assembly means is rotatable on a support rod means fastened to said first shaft and substantially parallel to said collet shaft, said cutter blade assembly means adapted to carry a plurality of cutter blades.

17. The apparatus as in claim 16 including means for adjusting the position of the cutting edges of said cutter blades with respect to a plane passing through said support rod means and said collet shaft.

18. The apparatus as in claim 12 including means to adjust the diameter of said collet to suit the size of different articles to be clamped thereto.

19. The apparatus as in claim 12 including means to bypass fluid from said cylinder back to said reservoir and simultaneously to move said first shaft outwardly in said supporting member.

20. The apparatus as in claim 12 including means to adjustably position the cutter blade assembly means at different radial distances from the collet axis.

* * * * *